(12) United States Patent
Mislenkov

(10) Patent No.: US 7,473,409 B2
(45) Date of Patent: Jan. 6, 2009

(54) PROCESS FOR RECYCLING WASTE ACID

(75) Inventor: Danny Mislenkov, Valparaiso, IN (US)

(73) Assignee: Veolia ES Technical Solutions L.L.C., Valparaiso, IN (US)

( * ) Notice: Subject to any disclaimer, the term of this patent is extended or adjusted under 35 U.S.C. 154(b) by 276 days.

(21) Appl. No.: 11/495,428

(22) Filed: Aug. 30, 2006

(65) Prior Publication Data

US 2008/0056982 A1  Mar. 6, 2008

(51) Int. Cl.
*C01B 17/90* (2006.01)
*C01B 25/234* (2006.01)
*C01G 3/10* (2006.01)
*C01G 49/14* (2006.01)
*C07C 51/42* (2006.01)
*C07C 309/01* (2006.01)

(52) U.S. Cl. .............. 423/321.1; 423/531; 423/557; 423/558; 423/DIG. 2; 562/30; 562/608

(58) Field of Classification Search .......... 423/321.1, 423/531, 557, 558, DIG. 2; 562/30, 608
See application file for complete search history.

(56) References Cited

U.S. PATENT DOCUMENTS 2,754,175 A 7/1956 Hendel et al.
6,099,814 A 8/2000 Langelin et al.
6,139,753 A * 10/2000 Taylor .................. 210/717
6,399,040 B1 6/2002 Dafft et al.
6,530,987 B1 3/2003 Auer et al.

FOREIGN PATENT DOCUMENTS

| CN | 1220970 | 6/1999 |
|---|---|---|
| JP | 50148294 | 11/1975 |
| JP | 10113674 | 5/1998 |
| WO | WO-9421349 | 9/1994 |

OTHER PUBLICATIONS

International Search Report and Written Opinion of the International Searching Authority for PCT/US2007/019024 mailed on Mar. 13, 2008.

* cited by examiner

*Primary Examiner*—Timothy C Vanoy
(74) *Attorney, Agent, or Firm*—McDonnell Boehnen Hulbert & Berghoff LLP

(57) ABSTRACT

A recycling process is presented to treat spent waste acid solutions whereby useful products are produced. Spent waste acid containing inorganic and organic contaminants is mixed with a magnesium compound containing aluminum and iron compounds that form oxyhydroxide flocs that complex, react, sequester and/or co-precipitate the contaminates from the admixture. The magnesium reacts with sulfate ions to form a high quality magnesium sulfate solution.

13 Claims, 1 Drawing Sheet

PROCESS FOR RECYCLING WASTE ACID

BACKGROUND OF THE INVENTION

The present invention relates to a recycling process that converts spent acid from a variety of industrial processes into useful commercially valuable products, including magnesium sulfate. In particular, my process converts spent sulfuric acid that can be classified as a RCRA hazard waste, into marketable products, including, smeltable metal oxides and magnesium sulfate.

Sulfuric acid is used in hundreds of industrial applications from metal finishing to food production. Some uses include pickling processes, oil refining, fertilizer production, pulp and paper production, and in the production of printed circuit boards, semiconductors and silicon wafers. In fact, sulfuric acid is the world's mot widely used chemical with U.S. consumption exceeding 38 million metric tons annually. Most, if not all, of these uses of sulfuric acid generate large volumes of spent waste sulfuric acid containing all types of inorganic and organic contaminants.

Typically, waste sulfuric acid is disposed of by a regeneration process that involves spraying sulfuric acid into a combustion furnace to generate sulfur dioxide ($SO_2$). This $SO_2$ is then converted to sulfur trioxide ($SO_3$) and eventually absorbed in 98% sulfuric acid to obtain 99+% pure sulfuric acid. These processes are disclosed in U.S. Pat. No. 6,399,040. Obviously, a major drawback of such disposal processes is the large amount of energy needed and the cost associated with the thermal decomposition.

Other known disposal processes involve the use of $CaCO_3$ or CaO treatment to neutralize the acid and form useable gypsum ($CaSO_4.2(H_2O)$). Gypsum is used in cement, dry wall, plaster and a number of other products. One process using $CaCO_3$ in a scrubber, as disclosed in U.S. Pat. No. 6,099,814, produces a secondary product of magnesium sulfate. The problem with these types of processes is that mountains of gypsum are produced that exceed the demand for such a product. Such processes, however, are limited in that the waste acid that can be used cannot contain metal contaminants that are typically found in waste acid streams, such as, copper, iron, lead and other metals that precipitate out with the gypsum, and thus lead to a low or no value product. In yet another disposal process spent sulfuric acid is used to form iron oxide pigments (see U.S. Pat. No. 6,530,987).

Because such large volumes of hazardous spent waste acids like sulfuric acid are generated every year, a need exists for a simple and efficient recycling process to convert these spent waste acid streams into useful and consumable products. My process accomplishes this goal as will become evident from the following specification and claims.

SUMMARY OF THE INVENTION

My invention provides a recycling process whereby spent waste acids preferably spent sulfuric acid, is contacted, in a controlled manner, with a magnesium compound, preferably magnesium oxide (MgO), which contains quantities of aluminum and iron. Alternatively, aluminum and iron can be added to the spent sulfuric acid as individual compounds separate and apart from the magnesium compound. By controlling the pH and temperature of the admixture that is formed when the magnesium compound is added to the spent acid, formation of aluminum and iron oxyhydroxide flocs occurs. These flocs then complex and react with the myriad of contaminants that are contained in the spent acid solution. Such contaminants or impurities typically include arsenic, antimony, copper, chromium, geranium, gallium and possibly a host of various organic compounds. The iron and aluminum oxyhydroxide flocs that are needed to remove these contaminants form at different pH values and each formation is responsible for removing various contaminants. Meanwhile the continued addition of the magnesium compound also results in the formation of magnesium sulfate by the reaction of $Mg^{+2}$ with $SO_4^{-2}$ disassociated from the sulfuric acid. After the pH and temperature controlled reaction is finished, the admixture of magnesium sulfate solution and flocs is filtered and can then be treated to obtain a high quality solution of $MgSO_4$. The filter cake obtained from the filtration process can be thermally treated to provide a high quality metal oxide or hydroxide product suitable for recycle to smelting or refining operations. More specifically, my recycling process involves a method of treating a spent acid solution contaminated with inorganic and organic impurities comprising, in combination, providing a spent waste acid containing compounds selected from the group consisting of sulfuric acid, copper sulfate, iron sulfate, organic acids, such as acetic acid, and inorganic acids, such as phosphoric acid, methyl sulfonic acid and combinations thereof containing impurities selected from the group consisting of arsenic, antimony, chromium, copper, geranium, gallium, at least one organic compound and mixtures thereof, forming an admixture initially having a pH of less than 5 by contacting the spent waste acid with a alkali Mg compound containing aluminum and iron, measuring and monitoring the pH of the admixture, agitating and maintaining the admixture at a temperature in the range from about ambient to about 97° C.; complexing the impurities contained in the spent waste acid through flocculation by forming flocs selected from the group consisting of iron oxyhydroxide, aluminum oxyhydroxide, copper oxyhydroxide and mixtures thereof; increasing the pH of the admixture by continued addition of the Mg compound to the admixture until a pH of 5 or higher is obtained; and isolating a solution containing magnesium sulfate by separating the flocs containing the impurities from the admixture using a filtration or other solid liquid separation process. Yet another embodiment of my invention involves a method of treating a spent acid solution contaminated with inorganic and organic impurities comprising, in combination, providing a spent waste acid containing compounds selected from the group consisting of sulfuric acid, organic acids, such as acetic acid, inorganic acids, such as phosphoric acid, methyl sulfonic acid and combinations thereof, and also containing impurities selected from the group consisting of calcium, iron, copper, arsenic, antimony, chromium, geranium, gallium, at least one organic compound and mixtures thereof; forming an admixture initially having a pH of less than 5 by contacting the waste stream with a alkali Mg compound, such as MgO, $Mg(OH)_2$, $MgCO_3$, $MgCO_3.XMg(OH)^2$, or any like material, containing iron and aluminum; measuring and monitoring the pH of the admixture; agitating the admixture and maintaining the admixture at a temperature in the range from about ambient to about 97° C.; adding the Mg compound until the pH of the admixture is greater than 2; forming iron oxyhydroxide flocs; complexing the spent waste acid impurities using the iron oxyhydroxide flocs while maintaining the pH of the admixture greater than 2; increasing the pH of the admixture to above 3.5; forming aluminum oxyhydroxide flocs; complexing the spent waste acid impurities with the aluminum oxyhydroxide flocs; increasing the pH of the admixture by continued addition of the Mg compound to the admixture until a pH of 5 or higher is obtained; analyzing the admixture to determine copper content; measuring the specific gravity of the admixture; and filtering the admixture to remove the complexed impurities and flocs to form a purified magnesium sulfate solution.

DETAILED DESCRIPTION

Figure 1:
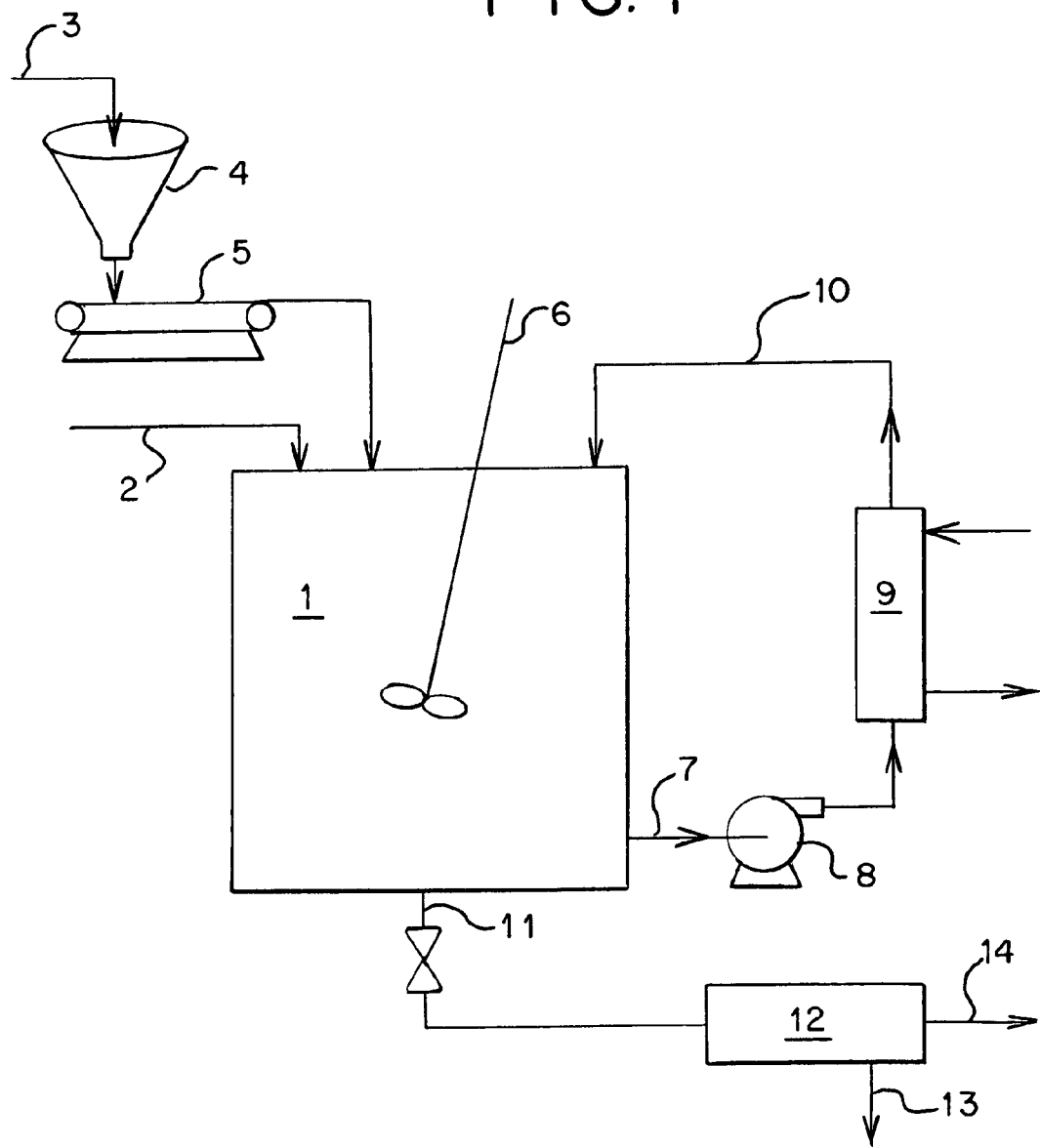
FIG. 1 is a schematic process flow diagram showing one embodiment of my recycling process invention operating as a batch operation.

Although FIG. 1 depicts only one of many possible embodiments, the process flow scheme shown is useful for the purposes of describing my recycling invention. Spent waste acid containing surfuric acid ($H_2SO_4$) is first added to tank 1 via line 2. As used herein, by spent waste acid is meant residue or effluent streams containing $H_2SO_4$, free $SO_2$, $SO_3$ or $SO_4^{-2}$ and having a pH lower than 5, more preferably a pH less than 1. Moreover, spent waste acid can also include other acids, such as organic acids, such as acetic, and inorganic acids, such as phosphoric and methyl sulfonic. Additionally, the spent waste acid typically includes a variety of contaminates, such as copper, arsenic, antimony, chromium, geranium, gallium and organic compounds. Although the exact composition of the spent waste acid is dependent on the source and original process that used the acid, preferably the spent waste acid will have the following range of compositions; sulfuric acid, $H_2SO_4$, from 1% to 99.4%, more typically the concentrations treated will range from 4.0% to 77% as $H_2SO_4$. The waste sulfuric acid may contain a wide range of inorganic contaminants such as but not limited to: Al, Ag, Ba, Ca, Cd, Cr, Cu, Fe, Mn, Ni, Pb, and Zn. The concentration of these inorganic contaminants will range from a low of 0.000189% to as high as 11.4%. There will also often be organic contaminants which measured in total as COD, Chemical Oxygen Demand, will range from 0.026% to 33,600%. There will usually be other inorganic impurities such as nitric acid, HNO3, ranging from 0.000043% to 1.2% and hydrogen peroxide, H2O2, ranging from 0.084% to 1.61%.

Before the spent waste acid is added to tank 1, some or all of it can be used in other processes such as in a de-tinning operation where the spent waste acid can be used to clean the de-tinned metals before recycling the metals to an end-user, such as a smelter. In any event, once the quantity and composition of the spent waste acid is known, then a stoichiometric amount of magnesium compound is determined based on the $SO_4^{-2}$ concentration in the spent waste acid in order to maximize the formation of $MgSO_4$.

The magnesium compound used in my invention is not critical and can be selected from the group consisting of MgO, $Mg(OH)_2$, $Mg(CO_3)_2$ and mixtures thereof. Magnesium compounds containing chloride or nitrogen compounds are not desirable. Additionally, or alternatively, waste streams containing relatively high concentrations of $Mg^{+2}$ could also be used. A particularly preferred source of the magnesium compound is MgO and in particular one that contains measurable quantities of both aluminum and iron. A typical MgO composition includes about 92 to about 97 wt. % MgO; about 0.2 to about 1 wt % Al; and about 0.2 to about 1 wt % Fe, more preferably 0.6 wt % Al and 0.3 wt % Fe. When inorganic or organic impurity levels are high more Al or Fe may be required. Because of the complexity of these waste acids this is best determined by experimentation for the individual waste acid. Additional Al and Fe can be added as reactive oxides directly to the acid or as their respective sulfates.

As discussed below it is important that the process include the use of $Fe^{+2}$ and $Al^{+2}$ because these metals form the oxyhydroxide flocs that sequester and complex with the contaminants contained in the spent acid. As Fe flocs and Al flocs are formed, those contaminates are removed from the magnesium sulfate solution that is simultaneously being formed by the addition of the magnesium compound. If the magnesium compound used does not contain sufficient Fe and/or Al compounds to form the necessary oxyhydroxide flocs then the addition of alternate sources of iron and/or aluminum compounds can be added to tank 1 as separate compounds. Preferably such compounds would include aluminum sulfate ($Al_2(SO_4)_3$) and iron sulfate ($FeSO_4$). Regardless of how the Fe and Al are added to admixture of the spent waste acid and magnesium compound, these two metals are necessary in order that ferric oxyhydroxide floc and aluminum oxyhydroxide flocs can form and co-precipitate, absorb, complex and/or coagulate the contaminates in the admixture, DOS removing the contaminants from the magnesium sulfate solution being formed by the reaction of $Mg^{+2}$ and $SO_4^{-2}$.

Preferably the magnesium compound is metered into tank 1 to ensure a homogenous admixture results. FIG. 1 depicts one possible method of adding the magnesium compound through the use of a hopper 4 and weigh scale configuration 5. Other methods are possible such as the use of an eductor system coupled with electronic controls for measured addition. In those circumstances where separate Fe and/or Al compounds must be added, similar or the same methods of addition can be used. Regardless of the method used for the addition of the magnesium compound it is highly desirable that the resultant admixture is well mixed to ensure efficient formation of magnesium sulfate. Accordingly, agitation is employed to provide intimate contact between the $Mg^{+2}$ and $SO_4^{-2}$ ions. In particular, as shown in FIG. 1, a mixer 6 is used to continuously stir the admixture in tank 1. Likewise, recirculation of the admixture via line 7, pump 8 and return line 10 will aid in the agitation. Additionally, although not shown in FIG. 1, an inline static mixture could be used in the recirculation loop to provide intense mixing of the magnesium compound and spent waste acid. Heat is also employed to assist in the reaction between the $Mg^{+2}$ and $SO_4^{-2}$. Initially the heat of reaction provides sufficient heat, however, as the reaction proceeds it becomes necessary to add heat from an external source. Likewise, ambient temperature may dictate more or less external heat addition. A preferred method of adding heat is the use of an inline heat exchanger 9. It is desirable to maintain the temperature of the admixture at from about ambient temperature to about 97° C., most preferably from about 85° C. to about 97° C.

In order to form the necessary oxyhydroxide flocs that are needed to remove the contaminants from the admixture pH monitoring and control is necessary. Initially the pH of the spent waste acid is typically around 1 or less. As the magnesium compound is added the pH begins to increase. Samples of the admixture are measured for pH periodically or continuously using known and accepted methods. Beginning at about a pH of about 2 the formation of ferric oxyhydroxide floc will begin. Formation of these iron flocs works as effective adsorbents for arsenic trioxide, antimony, chromium, geranium, gallium and a wide variety of organics. If the magnesium compound does not inherently contain iron, then an iron compound, such as iron sulfate, would be added before achieving a pH at around 2.2. Once the absence of soluble iron in the solution is noted, this indicates that the formation of the iron flocs has been achieved.

As more alkali magnesium compound is added to the admixture the pH begins to rise. At a pH of about 3.8 aluminum oxyhydroxide floc begins to form. As with the iron oxyhydroxide floc, the aluminum oxyhydroxide floc is an excellent flocculation agent for removing the various contaminants that were not removed by the iron oxyhydroxide. Also, if the magnesium compound does not contain aluminum or contain enough aluminum, an alternate source, such as aluminum sulfate, can be added separately in addition to the magnesium compound. In addition, we have surprisingly learned that the aluminum oxyhydroxide floc also removes any remaining quantities of the ferric oxyhydroxide floc that was not used to remove other contaminants. This is very important to producing a quality magnesium sulfate end product because even trace quantities of iron will discolor the magnesium sulfate solution. Even a level as low as 1 ppm gives off a yellow tint, and 5 ppm results in a muddy river appearance. Indeed, color is a critical quality control variable. My process yields a water white magnesium sulfate solution having a color analysis of about APHA 30 max. Therefore it is critical to remove any trace amounts of ferric oxyhydroxide using the aluminum oxyhydroxide.

Again, as more magnesium compound is added to tank 1, the pH continues to rise until a pH of about 5 is reached. At this point the addition of magnesium compound should be slowed or stopped and the pH and temperature monitored carefully. At a pH of about 5.3 any copper ions present in the admixture will begin to precipitate and will be completely removed from the magnesium sulfate solution at a pH of about 6.3 to 6.7. Analysis of the magnesium solution for copper and other metals will confirm whether additional magnesium compound needs to be added. It is preferable to have the heavy metals content of the magnesium sulfate solution at less than 5 ppm; the total selenium, cadmium and lead at less than 3 ppm and the total arsenic, antimony, beryllium, cobalt, nickel, chromium, manganese of less than 15 ppm. It is also desirable to arrive at a pH in the range of 6-9.2. After pH of 5-6 is reached, it may be necessary to stop adding the magnesium compound to avoid formation of oxysulfates. These oxy sulfates are detected easily because they are rock like in composition. Instead, magnesium hydroxide ($Mg(OH)_2$) can be added to tank 1 to further increase the pH of the desired range of 6-9.2.

Once the desired pH is reached, the admixture of magnesium sulfate and flocculated contaminants is removed from tank 1 via line 11 and filtered to separate the magnesium sulfate solution from the insoluble flocs. The specifics of the filtration step are not critical to my process and any known solids-liquid separation process can be used such as vacuum filtration or centrifugation. Preferably a filter press process 12 is employed. The filter cake 13 obtained can be further processed, for example by thermal treatment, to obtain a solid composite of metal oxides that can be sold to a metals refinery for use in a smelting process. The magnesium sulfate solution at a concentration in the range of from about 18 to 27 wt % is removed from the filtration process 12 via line 14 and sent to storage. Depending on the perceived end use of the magnesium sulfate further polishing treatments can be performed, such as, with ultra violet (UV) light exposure and/or carbon filtration. These additional polishing treatments remove any trace quantities of soluble inorganic and organic compounds not flocculated or removed in the filtration process.

One of the many distinctions of my process over the prior art methods of disposing of spent waste acid streams is that my process does not use any calcium compounds. In fact, the use of calcium would result in the formation of calcium sulfate (gypsum) which would precipitate out of solution with the ferric and aluminum oxyhydroxide flocs and result in an unacceptable gypsum product because of the heavy metals content of the starting waste acid. In fact, in certain circumstances it may be necessary to conduct a polishing step. To remove any trace amounts of calcium. Additionally, the filtration process would necessarily be much larger in capacity and require more solids handling capabilities. Accordingly, my process does not add any calcium compounds.

EXAMPLE

A waste acid with the following content was processed as described by the invention to produce high quality magnesium sulfate from waste sulfuric acid. Precipitating first ferric hydroxide by the addition of magnesium oxide than continuing to add magnesium oxide until both the soluble iron and the soluble aluminum were co-precipitated removing both inorganic and organic impurities form the resulting magnesium sulfate.

| Waste Acid (before treatment): | |
|---|---|
| Inorganic Impurities (as parts per million): | |
| Cd | 1,250 ppm |
| Cr | 10 |
| Cu | 1,200 |
| Mn | 20 |
| Ni | 1,310 |
| Zn | 10 |
| Total Organic Impurities (as Chemical Oxygen Demand) | |
| COD | 1,250 ppm |

After iron precipitation followed by co-current aluminum precipitation, the above impurities had been reduced to the following levels:

| Impurity | Improved Level | Percent Reduction |
|---|---|---|
| Cd | 390 ppm | −68.5% |
| Cr | 0.0 | −100% |
| Cu | 0.0 | −100% |
| Mn | 0.0 | −100% |
| Ni | 7.0 | −94.3% |
| Zn | 0.0 | −100% |
| Total Organics as COD | 390 | −68.5% |

Using the same feed as described above, holding the iron constant and raising the aluminum in solution before precipitation by 21% and then adding magnesium oxide to precipitate both the iron and the aluminum, we found that the Cd level was reduced to 280 ppm a reduction of 78% over the starting level.

It should be understood that the embodiments and examples disclosed herein are presented for illustrative purposes only and that many other combinations and articles that embody the methods will be suggested to persons skilled in the art and, therefore, the invention is to be given its broadest interpretation within the terms of the following claims:

I claim:

1. A method of treating a spent acid solution contaminated with inorganic and organic impurities comprising, in combination,
   a) providing a spent waste acid containing compounds selected from the group consisting of sulfuric acid, copper sulfate, iron sulfate, acetic acid, phosphoric acid, methyl sulfonic acid and combinations thereof, and also containing contaminants selected from the group consisting of arsenic, antimony, chromium, germanium, gallium, copper, at least one organic compound, and mixtures thereof;

b) forming an admixture initially having a pH of less than 5 by contacting the spent waste acid with a Mg compound containing aluminum and iron;

c) measuring and monitoring the pH of the admixture;

d) agitating and maintaining the admixture at a temperature in the range from about ambient to about 97° C.;

e) complexing the contaminants contained in the spent waste acid through flocculation by forming flocs selected from the group consisting of iron oxyhydroxide, aluminum oxyhydroxide, copper oxyhydroxide and mixtures thereof;

f) increasing the pH of the admixture by continued addition of the Mg compound to the admixture until a pH of 5 or higher is obtained; and g) isolating a solution containing magnesium sulfate by separating the flocs containing the contaminants from the admixture using a filtration process.

2. The method of claim 1 further comprises analyzing the spent waste acid to determine sulfate concentration.

3. The method of claim 2 further comprises determining the stoichiometric amount of Mg needed to react with the sulfate to form magnesium sulfate.

4. The method of claim 1 further comprises adding the Mg compound as a solid comprising at least 95 wt. % MgO.

5. The method of claim 1 further comprises metering and educting the Mg compound into the spent waste acid.

6. The method of claim 1 further comprises agitating the admixture using a stirred tank and recirculation.

7. The method of claim 6 further comprises maintaining the temperature of the admixture by passing the admixture through a heat exchanger during recirculation.

8. The method of claim 1 further comprises treating the magnesium sulfate solution to remove any organic compound contaminants originally present in the spent waste acid.

9. The method of claim 8 further comprises using UV radiation to remove organic contaminants in the magnesium sulfate solution.

10. The method of claim 8 further comprises carbon treating the magnesium sulfate solution to remove organic contaminants.

11. A method of treating a spent acid solution contaminated with inorganic and organic contaminants comprising, in combination, a) providing a spent waste acid containing compounds selected from the group consisting of sulfuric acid, acetic acid, phosphoric acid, methyl sulfonic acid and combinations thereof, and also containing contaminants selected from the group consisting of calcium, iron, arsenic, antimony, copper, chromium, germanium, gallium, at least one organic compound and mixtures thereof;

b) forming an admixture initially having a pH of less than 5 by contacting the spent waste acid with a Mg compound and compounds containing aluminum and iron;

c) measuring and monitoring the pH of the admixture;

d) agitating and maintaining the admixture at a temperature in the range from about ambient to about 97° C.;

e) complexing the contaminants contained in the spent waste acid through flocculation by forming flocs selected from the group consisting of iron oxyhydroxide, aluminum oxyhydroxide, copper oxyhydroxide and mixtures thereof;

f) increasing the pH of the admixture by continued addition of the Mg compound to the admixture until a pH of 5 or higher is obtained;

g) isolating a solution containing magnesium sulfate by separating the flocs containing the contaminants from the admixture using a filtration process; and h) forming a filter cake in the filtration process comprising the flocs and drying the filter cake to form a solid product containing metal oxides suitable for recycling in a smelting process.

12. A method of treating a spent acid solution contaminated with inorganic and organic contaminants comprising, in combination, a) providing a spent waste acid containing compounds selected from the group consisting of sulfuric acid, acetic acid, phosphoric acid, methyl sulfonic acid and combinations thereof, and also containing contaminants selected from the group consisting of calcium, iron, arsenic, antimony, copper, chromium, germanium, gallium, at least one organic compound and mixtures thereof;

b) forming an admixture initially having a pH of less than 5 by contacting the waste stream with a Mg compound containing iron and aluminum;

c) measuring and monitoring the pH of the admixture;

d) agitating the admixture and maintaining the admixture at a temperature in the range from about ambient to about 97° C.;

e) adding the Mg compound until the pH of the admixture is greater than 2;

f) forming iron oxyhydroxide flocs;

g) complexing the spent waste acid contaminants using the iron oxyhydroxide flocs while maintaining the pH of the admixture greater than 2;

h) increasing the pH of the admixture to above 3.5;

i) forming aluminum oxyhydroxide flocs;

j) complexing the spent waste acid contaminants with the aluminum oxyhydroxide flocs;

k) increasing the pH of the admixture by continued addition of the Mg compound to the admixture until a pH of 5 or higher is obtained;

l) analyzing the admixture to determine copper content;

m) measuring the specific gravity of the admixture; and n) filtering the admixture to remove the complexed contaminants and flocs to form a magnesium sulfate solution.

13. The method of claim 12 further comprises carbon treating the magnesium sulfate solution.

* * * * *